INVENTORS.
LAWRENCE A. COLAROSSI, THOMAS S. JAMES,
GEBHART J. REILING, ANTHONY TARQUINIO.
BY
Brown, Critchlow, Flick & Peckham.
ATTORNEYS.

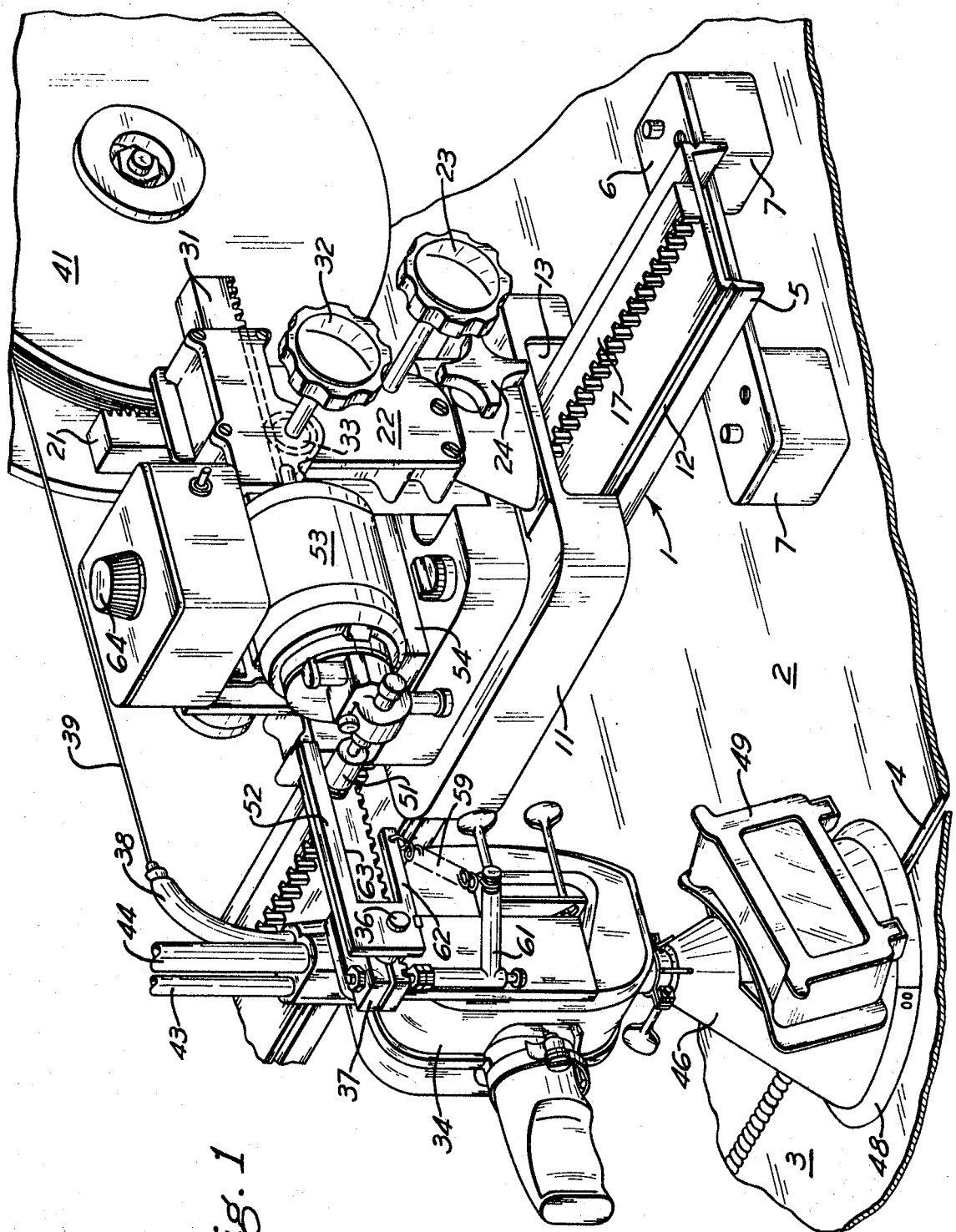

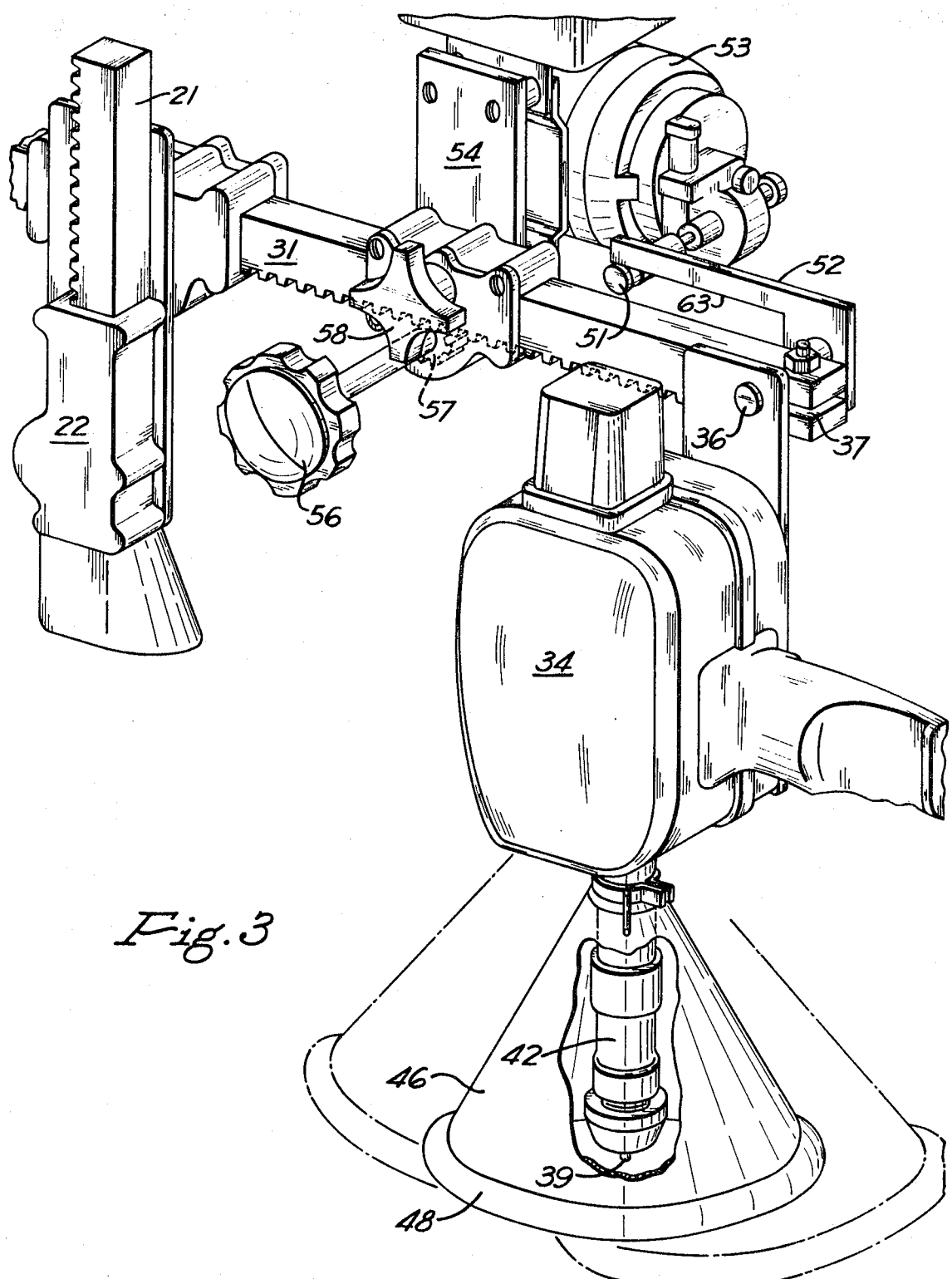

INVENTORS.
LAWRENCE A. COLAROSSI, THOMAS S. JAMES,
GEBHART J. REILING, ANTHONY TARQUINIO.
BY

Brown, Critchlow, Flick & Peckham.
ATTORNEYS.

INVENTORS
LAWRENCE A. COLAROSSI, GEBHART J. REILING, Jr.
ANTHONY V. TARQUINIO & THOMAS S. JAMES,
DECEASED, BY JOANNE ELIZABETH WILLIS
EXECUTRIX
BY Shoemaker and Mattare
ATTORNEYS

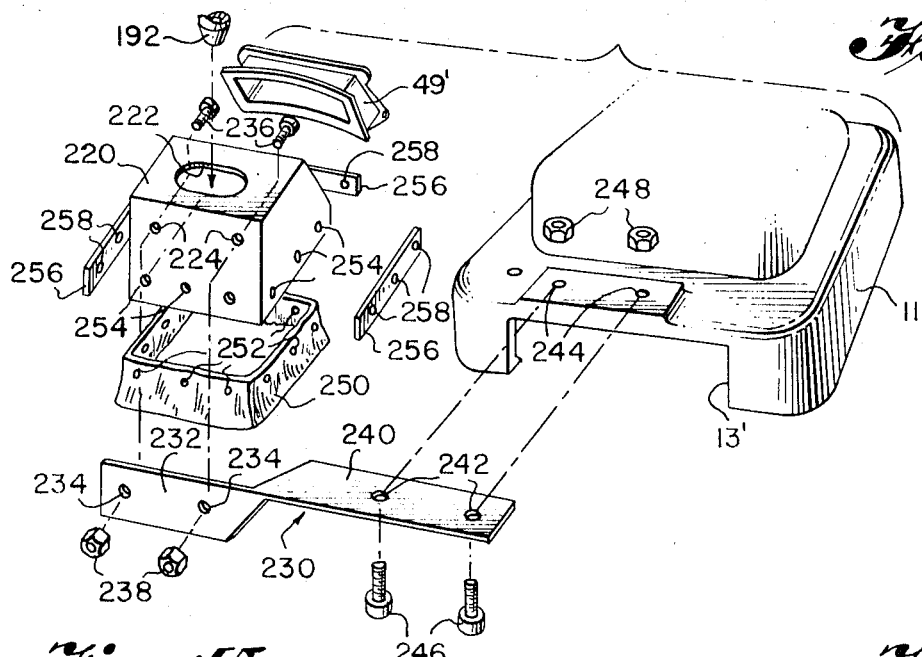
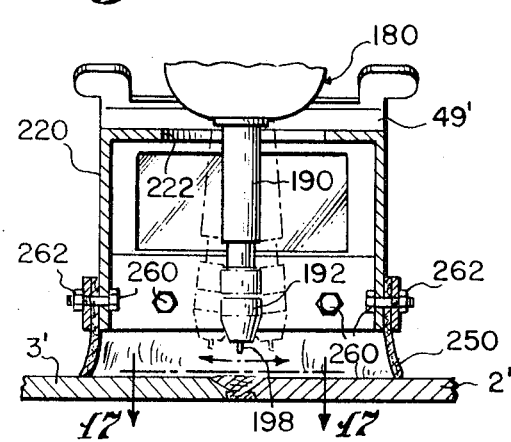
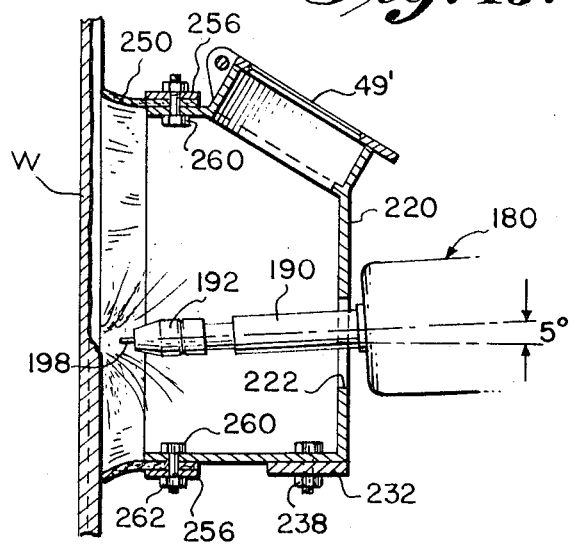
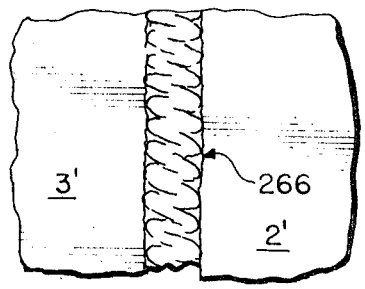
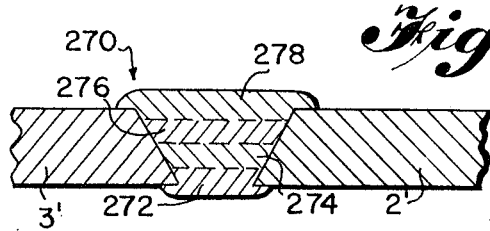

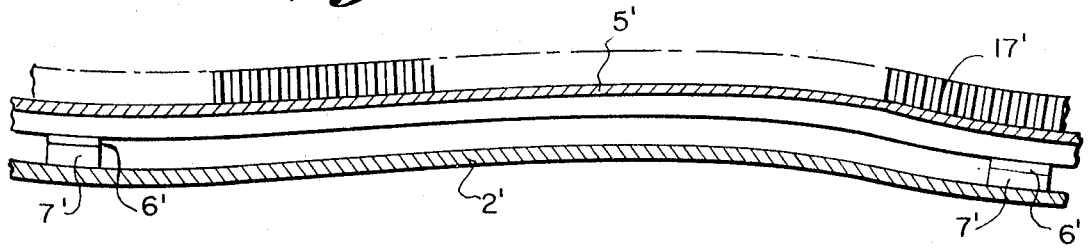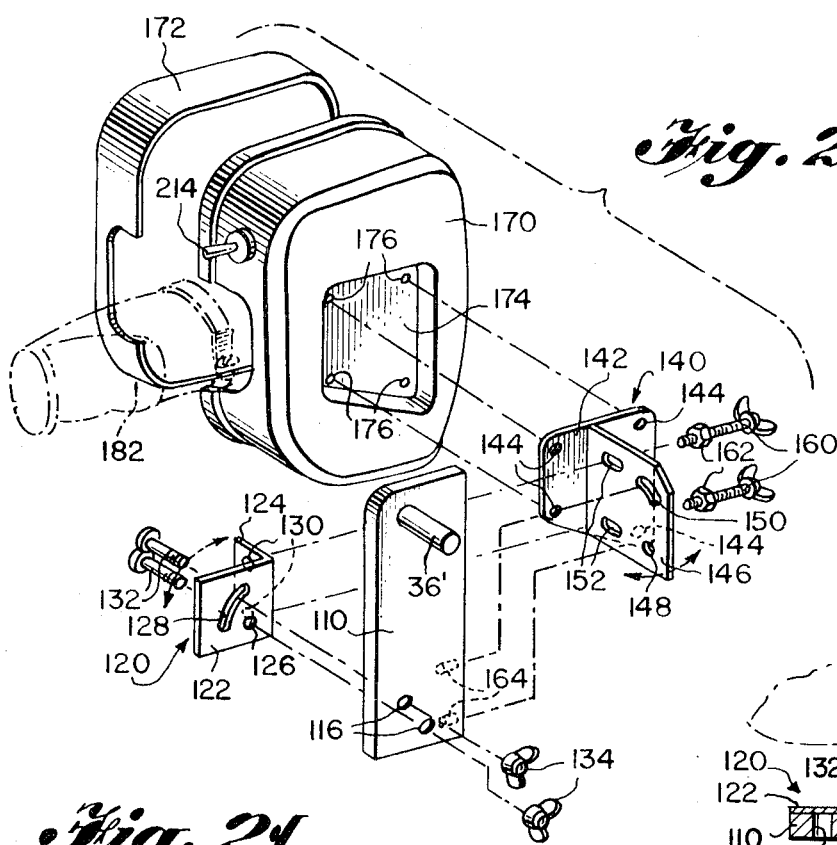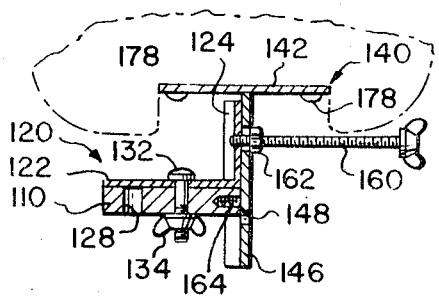

United States Patent Office 3,515,844
Patented June 2, 1970

3,515,844
PORTABLE WELDING APPARATUS
Lawrence A. Colarossi, Aliquippa, Gebhart J. Reiling, Jr., Pittsburgh, Anthony V. Tarquinio, Coraopolis, Pa., Thomas S. James, deceased, late of Pittsburgh, Pa., by Joanne Elizabeth Willis, executrix, Pittsburgh, Pa., assignors to Pittsburgh-Des Moines Steel Company, Pittsburgh, Pa., a corporation of Pennsylvania
Continuation-in-part of application Ser. No. 474,067, July 22, 1965. This application Jan. 22, 1969, Ser. No. 795,402
Int. Cl. B23k 9/12
U.S. Cl. 219—125                        25 Claims

ABSTRACT OF THE DISCLOSURE

A main carriage is movably driven along a base means secured to a workpiece and extending substantially parallel with a seam to be welded. A rack post extends perpendicularly from the main carriage and carries a second carriage. Means is provided for manually and continuously adjusting the position of this second carriage. A rack arm is carried by the second carriage and extends substantially perpendicular to the direction of movement of the second carriage as well as also extending substantially perpendicular with said seam. Means is provided for continuously manually adjusting the position of said rack arm with respect to the second carriage. A welding head is pivotally carried by the outer end of the rack arm and means is provided for oscillating the welding head with respect to the rack arm. The welding head is oscillated by a driven cam engaging an oscillator bar connected to the welding head. This cam is carried by a third carriage which is mounted on the rack arm. Means is provided for continuously manually adjusting the position of the third carriage with respect to the rack arm.

CROSS-REFERENCE TO RELATED APPLICATION

The present application is a continuation-in-part application of copending U.S. patent application Ser. No. 474,067, filed July 22, 1965.

BACKGROUND OF THE INVENTION

The present invention relates generally to welding apparatus, and is particularly applicable to welding the plate components of large storage tanks, pressure vessels and like structures made of ferrous or non-ferrous materials. The welding apparatus of the present invention is of the electrical arc welding type using an inert gas shield.

Welding apparatus according to the present invention is especially adapted for carrying out welding operations in the field. Accordingly, it is essential to provide welding apparatus which is readily portable and can be carried to the job site and mounted in proper operative position in a quick and efficient manner.

The welding apparatus must accordingly be compact and relatively lightweight, and yet at the same time must be capable of automatically operating and producing welds of high quality and uniformity. The apparatus must be readily capable of being operated in all positions regardless of the orientation or thickness of the associated workpiece.

The apparatus may also be employed with workpieces which are curved, and it is therefore necessary to provide means for supporting and guiding the welding apparatus which can readily conform to the curvature of the associated workpiece.

Since the apparatus is mounted in place in the field, it is necessary to provide a number of manually operable selective adjustments so that the apparatus can be effectively operated. The base means which supports the welding apparatus is mounted in place on a workpiece so that it extends substantially parallel with a seam to be welded between two adjacent workpieces. However, due to the fact that the base means must be mounted in the field, and in many different positions, the bease means is not always accurately positioned with respect to the associated seam. It is, accordingly necessary to provide certain adjustments whereby the welding head can be properly continuously positioned relative to the seam to be welded.

The welding head of the present invention is of the type wherein the supported welding wire or electrode is oscillated back and forth across the seam as it progresses therealong. Each half cycle of such oscillations includes firstly a traverse portion in which the electrode moves across the seam through the full amplitude of the oscillation, and secondly a dwell portion, in which the oscillatory movement of the electrode momentarily ceases at the end of the traverse. It is a feature of the present invention to provide a dwell portion of each electrode oscillation which has a duration at least equal to that of the traverse portion, and preferably the dwell time is about twice the traverse portion.

It is also desirable to provide an arrangement wherein means is provided for continuously adjusting the amplitude and frequency of such oscillations.

SUMMARY OF THE INVENTION

In the present invention, an elongated base means is provided which is adapted to be supported on a workpiece, the edge of which is to be welded to an adjacent workpiece. The base means extends substantially parallel with the seam between the two workpieces, and the base means is of a flexible construction so that it can readily conform to any curvature which may exist in the associated workpiece. A main carriage is movably mounted on the base means, and drive means is provided for moving the carriage along the base means.

A second carriage is movably carried by the main carriage and means is provided for continuously manually adjusting the position of the second carriage in a direction extending substantially normal to the main carriage. A rack arm is movably supported by the second carriage and is movable in a direction extending substantially perpendicular to the direction of movement of the main carriage and the second carriage. Means is provided for continuously manually adjusting the position of this rack arm with respect to the second carriage.

A welding head is pivotally carried at the outer end of the rack arm and is adapted to oscillate back and forth across the seam to be welded. Oscillation of the welding head is produced by a unique rotatable cam which engages an oscillator bar interconnected with the welding head. The rotatable cam is carried by a third carriage which is movably mounted on the rack arm. Means is also provided for continuously manually adjusting the position of the cam means with respect to the rack arm to adjust the point of contact between the cam and the associated oscillator bar whereby the amplitude of the oscillations of the welding head are controlled.

Means is also provided for continuously adjusting the speed of rotation of the cam so as to adjust the frequency of oscillation of the welding head and the electrode supported thereby with respect to the seam being welded.

The adjustment of the second carriage in a direction normal to the main carriage enables the welding head to be moved away from the associated workpieces when the weld is completed, and additionally enables the welding head to be properly positioned with respect to the workpieces when the weld is being carried out.

The adjustment of the rack arm in a direction substantially perpendicular to the direction of movement of the second carriage as well as the direction of the seam is essential in order to make fine adjustments of the welding head laterally of the main carriage so that the welding head is properly positioned with respect to the seam being welded. This enables the welding head to be accurately located along the seam, particularly in those cases when the seam does not extend exactly parallel with the base means which supports the main carriage.

The aforementioned adjustments which permit the welding head to be adjusted in two mutually perpendicular directions with respect to the direction of movement of the main carriage is essential in order to properly operatively position the welding head in the field where accurate positioning of the seam with respect to the base means is not possible as in the case of large fixed installations.

In a modified form of the invention, the shield means surrounding the nozzle of the welding head is carried by the main carriage instead of being supported by the welding head itself. This reduces the weight on the welding head thereby reducing wear and friction on the moving parts such as the cam and driving spur gears and the like thereby substantially increasing the useful life of the apparatus.

In the modified form of the invention, the welding head includes a removable welding gun assembly so that the welding gun can be dismantled from the welding apparatus and used independently if so desired.

In addition, the modified form of the invention enables adjustment of the welding head in two mutually perpendicular planes with respect to the support means which is operatively connected with the oscillating means. These adjustments of the welding head enable the welding head to be adjusted for various operating conditions of the apparatus.

The welding apparatus of the present invention is accordingly very light, compact, and portable. It may be used in any position such as downhand, overhead, horizontal, and vertical. The controls for operating the apparatus are very simple and can be adjusted during the actual welding operation without necessity of stopping the apparatus or the welding operation. Relatively unskilled personnel can readily operate the welding apparatus of the present invention, and parts of the machine can be removed and replaced in a simple manner in the field, if necessary, without shipping the apparatus back to a shop for repair.

A unique cam arrangement is provided for oscillating the welding head, and the dwell provided by the cam is necessary in order that the machine will operate in all of the aforementioned different positions.

The portable welding apparatus as shown herein is described in connection with a pair of workpieces which are butt welded together. It should be understood that the apparatus is also very useful for placing overlays or cladding on a material or workpiece such as the lining of a nuclear reactor vessel. The MIG process is used extensively for such overlays, and the oscillatory nature of the welding gun creates a minimum of dilution in the parent material. The apparatus can also be used for fillet welds, such as around the connection of a large nozzle to a vessel.

BRIEF DESCRIPTION OF THE DRAWINGS

FIG. 1 is an isometric front view of welding apparatus embodying the present invention;

FIG. 3 is another isometric rear view, showing the cam assembly and welding head omitted from FIG. 2;

FIG. 13 is a view similar to FIG. 1 illustrating a modified form of the present invention;

FIG. 14 is a top perspective exploded view illustrating a portion of the structure shown in FIG. 13 and particularly showing the manner in which the shield means is supported by the main carriage;

FIG. 15 is a sectional view taken substantially along line 15—15 of FIG. 13 looking in the direction of the arrows;

FIG. 16 is a vertical section through the shield means illustrating the position of the components when the apparatus is utilized for welding along a vertical seam;

FIG. 17 is a view taken along the line 17—17 of FIG. 15 looking in the direction of the arrows;

FIG. 18 is a sectional view through a typical multi-pass weld;

FIG. 19 is a sectional view illustrating the manner in which the base means is adapted to conform to the curvature of a workpiece;

FIG. 20 is a top perspective view illustrating the manner in which the welding head is supported on the apparatus;

FIG. 21 is a sectional view taken substantially along line 21—21 of FIG. 13 looking in the direction of the arrows and illustrating a first manner of adjustably supporting the welding head; and FIG. 22 is a view similar to FIG. 21 illustrating a further manner of adjustably supporting the welding head.

DESCRIPTION OF THE PREFERRED EMBODIMENTS

Figure 11:
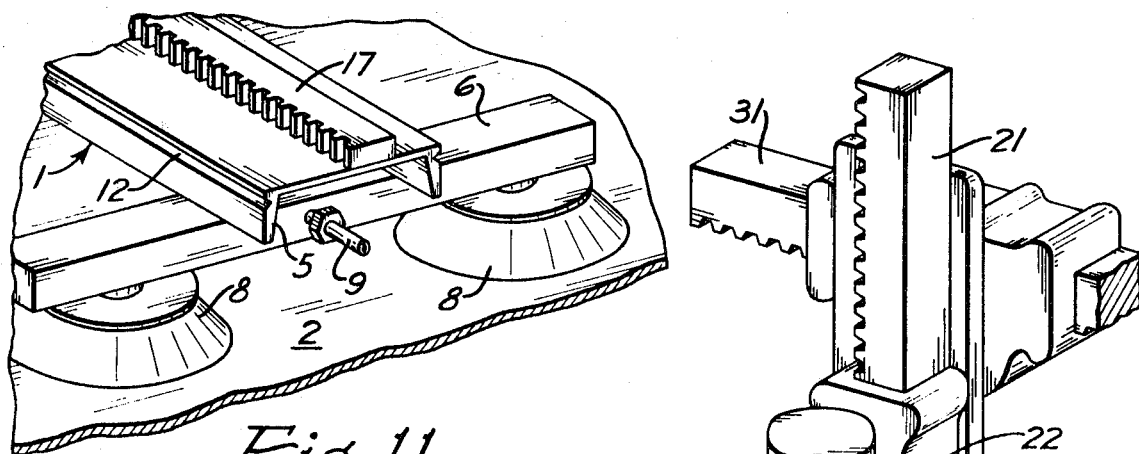
FIG. 11 is a fragmentary isometric view of a modified means for securing the base to the work.
Figure 2:
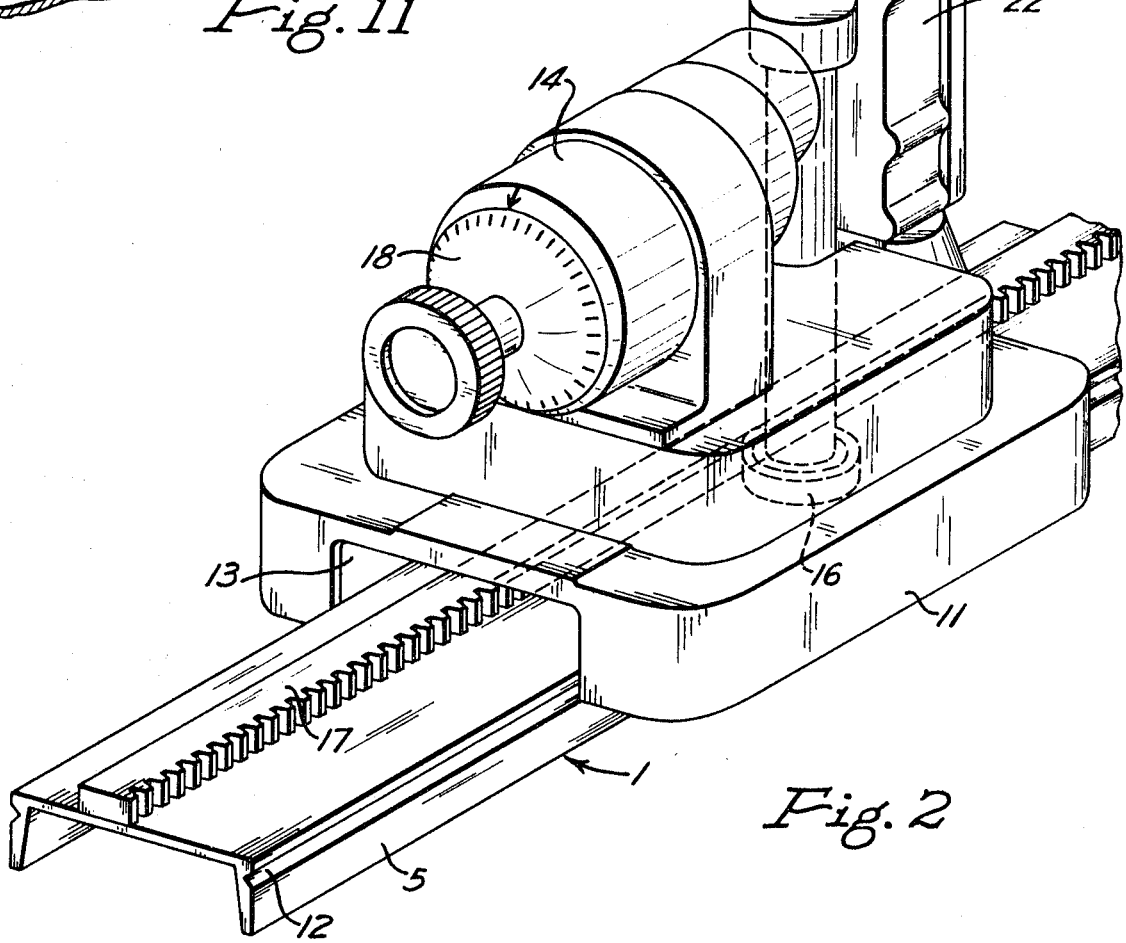
FIG. 2 is a similar rear view of a portion of the same apparatus, with the cam assembly and welding head omitted for clarity.

Referring now to the drawings wherein like reference characters designate corresponding parts throughout the several views, a first form of welding apparatus according to the present invention is shown in FIGS. 1–12 inclusive wherein the welding apparatus includes a base 1, which is adapted to be supported on the work being welded. This work is represented in the drawings as portions of flat steel plates 2 and 3, extending substantially horizontally, the adjacent edges of which form a seam 4 that is to be welded. The base is preferably in the form of an elongated channel 5 supported on cross members 6, which are provided with suitable means for securing the base to the supporting plate member. Where the plates are of magnetizable material, the securing means may be permanent magnets 7 attached as feet to the cross members 6. Where the plates are non-magnetic, conventional vacuum cups 8 (shown in FIG. 11) may be used and connected through a tube fitting 9 to a suitable vacuum pump (not shown). If the plates have a curved surface, the base preferably conforms to their curvature, so that the base will be at a substantially constant height above its supporting plate.

A first or main carriage 11 is slidably mounted for lengthwise reciprocation on base 1 and is preferably keyed to the base by conventional means, for example, by V-shaped grooves 12 in each side of the base that are adapted to slidably interlock with complementary ribs (not shown) on the sidewalls of a slot 13 extending lengthwise of the carriage. Movement of the main carriage on its supporting base is provided by a variable speed motor 14 mounted on the carriage and connected by suitable gears (not shown) to a pinion 16 engaging a rack bar 17 secured to the top of the base (see FIG. 2). A manually adjustable speed control 18 is mounted on motor 14 for changing the speed of the motor. Other conventional means (not shown) are provided for reversing the direction of rotation of motor 14. The elements recited in this paragraph permit the main carriage to be driven at a desired constant or variable speed back and forth along the length of the base.

Mounted on top of the primary carriage and extending normal thereto (i.e., vertically as the apparatus is illustrated in FIG. 1) is a rack post 21, on which is slidably supported a second carriage 22. The position of the carriage on the post can be manually adjusted by turning a knob 23 connected to a pinion (not shown) that engages the rack portion of the post. A second knob 24 threadably mounted on the second carriage is adapted to clamp that carriage on the post at the desired height.

The second carriage 22 slidably supports a rack arm 31 for reciprocal movement in a direction perpendicular to the directions of movement of the first and second carriages. The position of the rack arm may be adjusted relative to the second carriage by manually turning a knob 32, which is connected to a pinion 33 that engages the rack portion of the arm. A locking device (not shown) similar to that described for locking the second carriage may also be provided if desired. At one end of rack arm 31, a welding head 34 is supported by a shaft 36 in a bearing 37 for pivotal movement relative to the arm. The welding head is conventional: it includes a guide 38, through which a welding wire or electrode 39 is fed from a spool 41 by usual motor driven feeding means (not shown) to the nozzle 42 at the bottom of the head; electrical cables 43 from an adjustable source of electric power (not shown); and a conduit 44 for supplying an atmosphere of an inert gas over the area being welded. In addition, the head is provided with a cone shield 46, the base of which is fitted with a flexible draft control skirt 48 for sealing the area to be welded from the ambient atmosphere and with a hinged viewing window 49 to permit the operator to watch the welding operation.

Oscillation of the welding head and its supported electrode across the seam 4 to be welded is controlled by a cam 51 and an oscillator bar 52, which acts as a cam follower. The cam is supported on and supported on and rotated by a variable speed electrical motor 53, which is in turn supported on a third carriage 54 mounted on rack arm 31. The position of this carriage on that arm can be manually adjusted by turning a knob 56, which is connected to a pinion 57 that engages the rack portion of arm 31 (see FIG. 3). Another knob 58 locks the third carriage in the desired position on arm 31. Oscillator bar 52 is secured to shaft 36, so that moving of the free end of the bar will rock that shaft and also welding head 34 relative to arm 31. A coil spring 59 (see FIG. 1) secured at one end to an angle bolt 61 fixed on arm 31 and at the other end to a leg 62 on oscillator bar 52 urges the underside edge 63 of the oscillator bar against cam 51. It will be apparent that the distance of the line of engagement of this cam and the oscillator bar from the axis of shaft 36 controls the amplitude of the oscillations of the welding head and its supported electrode. As described above, that distance can be varied by moving the third carriage on its supporting arm 31 until the cam is at the desired distance from that axis. Likewise, the speed of rotation of the cam can be varied by manually adjusting a speed control knob 64 mounted on top motor 53.

Cam 51 is designed to oscillate the welding head 34 in accordance with a predetermined pattern of oscillation that will provide a substantially flat weld bead in the seam to be welded. It has been found that the most effective pattern is one in which the oscillatory movement of the welding head is momentarily arrested at the end of each traverse across the seam to be welded, so that each half cycle of oscillation includes a traverse portion representing the full amplitude of the oscillation and a dwell portion at the end of each traverse portion, with the dwell portion lasting approximately twice as long as the traverse portion. With such a pattern of oscillation, there is sufficient heat liberated at and near the sides, relative to the central part, of the seam to assure a flat weld bead across the seam. This may be compared to the conventional weld, which is characterized by a rounded protruding bead resulting from the deposition of too much weld metal in the central portion of the seam.

Figure 4:
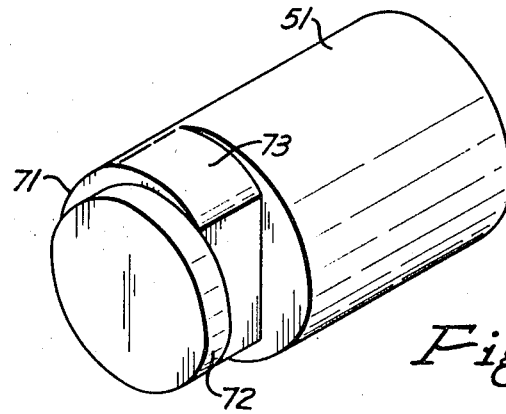
FIG. 4 is an enlarged isometric view of a preferred form of cam for oscillating the welding head and its supported electrode.
Figure 5A:
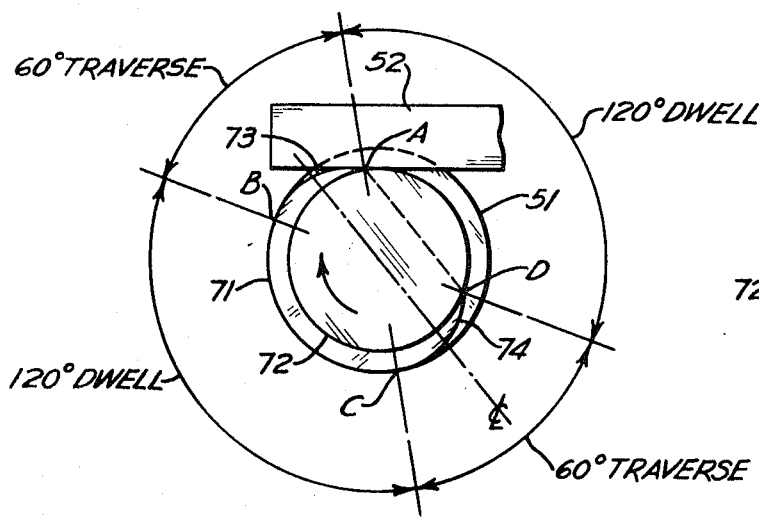
FIGS. 5a and b through 10a and b are diagrammatic views (from the front and side of the cam, respectively) of the cam of FIG. 4 and its oscillator bar follower, showing their respective positions at various points in one oscillatory cycle respresented by a single rotation of the cam.

Cam 51, which is designed to produce the desired pattern of oscillation, is shown in enlarged perspective view in FIG. 4. Diagrammatic end views of the cam and side views of its oscillator bar follower 52 are shown in FIGS. 5a–10a inclusive, and side views of the end of the cam and sections of the oscillator bar are shown in FIGS. 5b–10b inclusive. As shown particularly in FIG. 5a, the operating surface of the cam during a single clockwise rotation through 360° provides a traverse portion of 60° (A to B) followed by a dwell portion of 120° (B to C), then a second traverse portion of 60° (C to D) in the opposite portion, and last a dwell portion of 120° (D to A). The cam surface to produce this effect is provided by two axially adjacent concentric cylindrical portions 71 and 72 of different diameters, with one of the cylindrical portions decreasing in radius at each end at a constant rate to provide spiral portions 73 and 74. Since oscillator bar 52 is thick enough to engage whichever of these surfaces has the larger radius as the cam turns, the effective cam contour is defined by the curve ABCDA (see FIG. 5a), which consists of an increasing spiral segment AB extending for 60°, a circular segment BC extending for 120°, a decreasing spiral segment CD extending for 60°, and a circular segment DA (of smaller radius than segment CD) extending for 120°. The above description is based on the assumption that the cam is rotating clockwise as indicated in FIG. 5a. By making the cam of two axially adjacent portions, both of which are subtended by the oscillator bar follower, manufacture is simplified over a conventional cam having a single contoured surface.

Figure 5B:
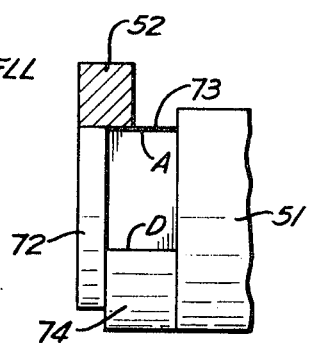
Figure 6A:
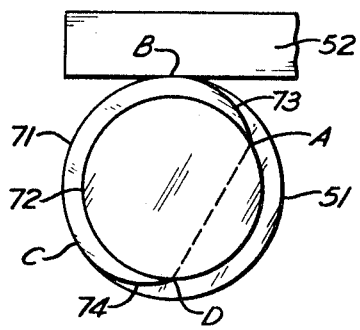
Figure 6B:
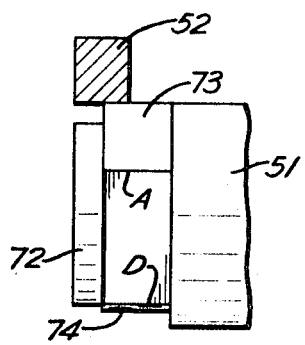
Figure 7A:
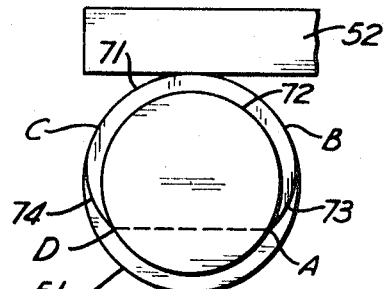
Figure 7B:
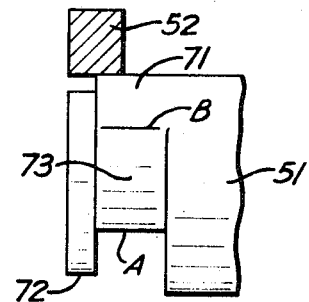
Figure 8A:
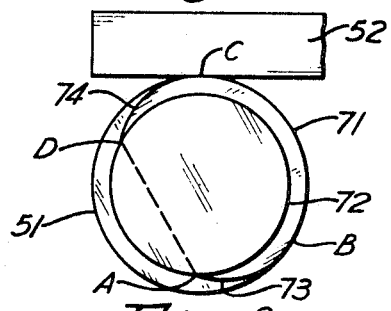
Figure 8B:
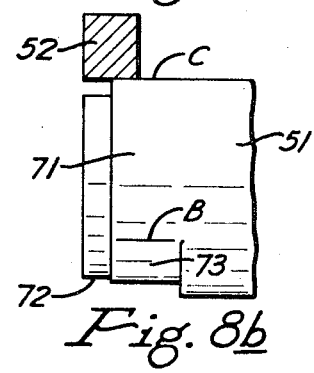
Figure 9A:
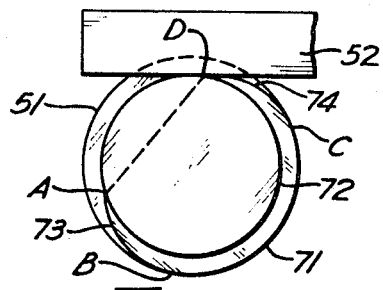
Figure 9B:
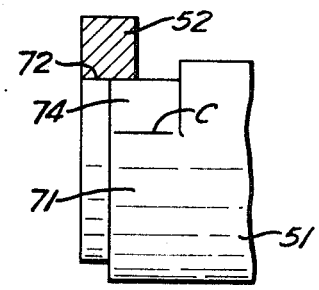
Figure 10A:
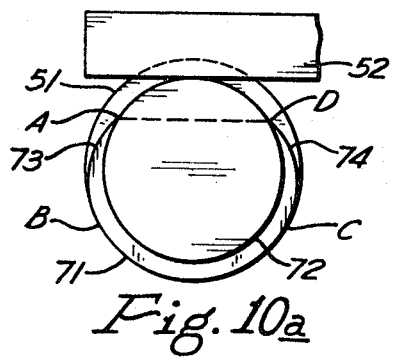
Figure 10B:
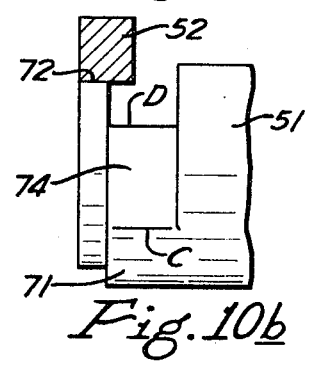
Figure 43:
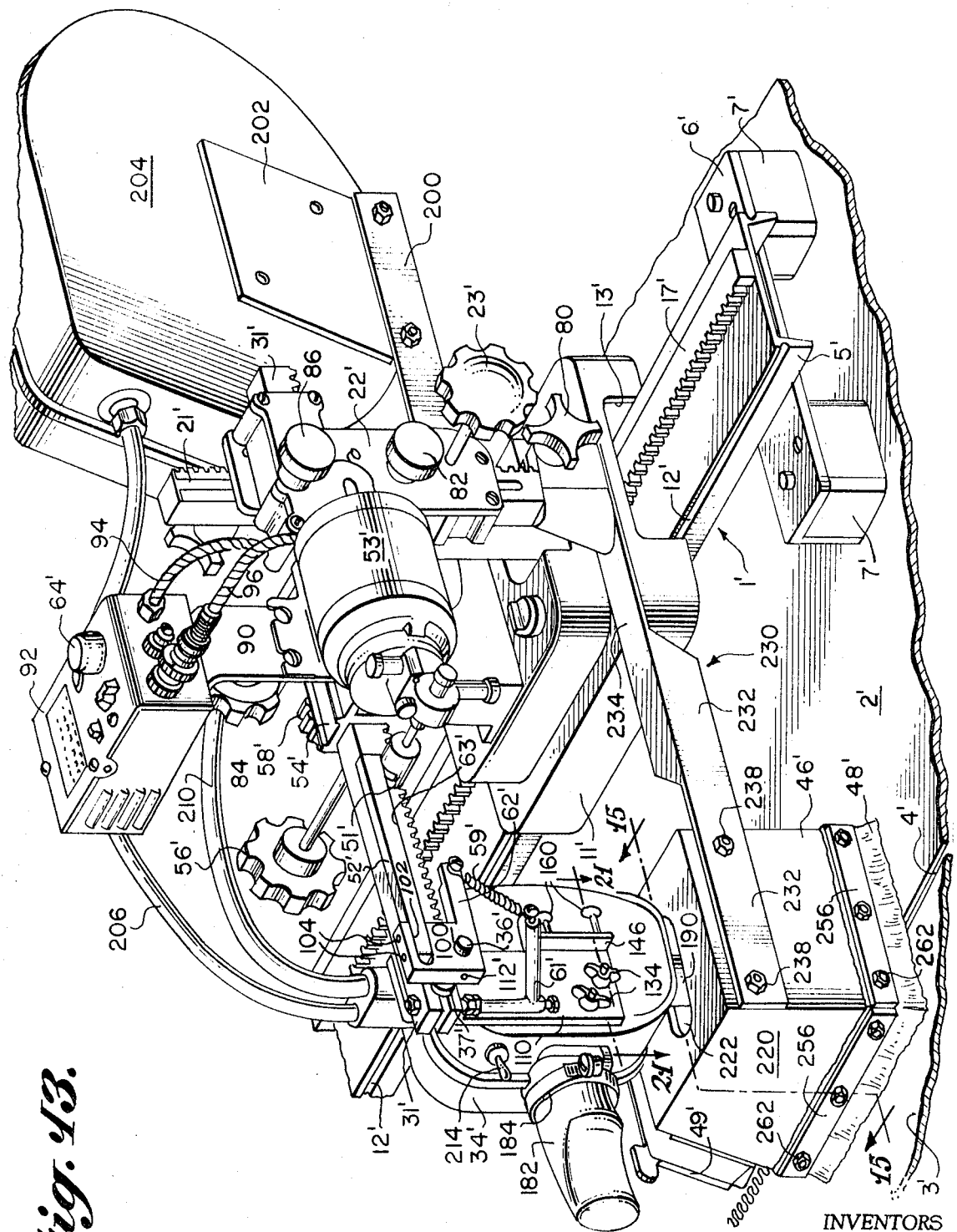

In the position shown in FIGS. 5a and 5b, the welding head 34 and its supported electrode are just beginning a traverse across the seam 4. When the cam has turned 60°, the bar and cam will be in the positions shown in FIGS. 6a and 6b, and the welding head will have completed its traverse. During this 60° rotation (see FIGS. 5a–6a and 5b–6b), the oscillator bar will have been in contact with the increasing spiral segment AB of the cam surface. During the next 120° rotation of the cam (see FIGS. 6a–8a and 6b–8b), the oscillator bar will contact the larger circular segment BC of the cam surface, so that the welding head will remain motionless or dwell at or near one side of the seam. During the next 60° rotation of the cam (see FIGS. 8a–9a and 8b–9b), the oscillator bar will move along the decreasing spiral segment CD of the cam surface, so that the welding head will traverse the seam in the opposite direction. In the final 120° of its single revolution, in which the cam turns from the position shown in FIGS. 8a and b through that shown in FIGS. 10a and b to return to the position shown in FIGS. 5a and b, the oscillator bar follows the smaller circular segment DA of the cam surface and the welding head dwells on the side of the seam opposite to that of the previous dwell portion.

If the cam is rotating at a constant speed, as it normally will be except for adjustments from time to time, it is apparent that the time of each dwell portion of the welding head and its supported electrode at or near the side of the seam will be twice the time of each traverse portion across the seam. During these oscillations, the welding head is, of course, progressing along the seam from the motion imparted to the main carriage 11 by its drive motor 14. The combination of its progression lengthwise of the seam and its oscillation across the seam produces, for the cam configuration herein described, a modified square wave pattern of the type shown in FIG. 12, in which the horizontal dimension represents motion along the axis of the seam and the vertical dimension represents motion across the seam. The various portions of this wave form are lettered in accordance with the corresponding segments of the cam surface that generate them, although it will be understood that the scale of FIG. 12 has been greatly exaggerated for clarity.

Figure 12:
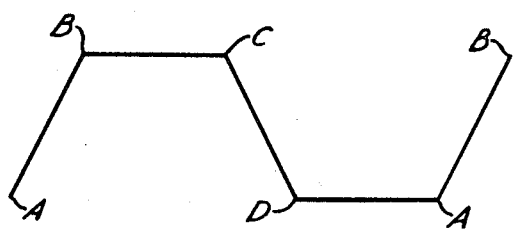
FIG. 12 is a diagrammatic view of the preferred waveform of the oscillations of the welding head and its supported electrode, as produced by the cam of FIG. 4.

The amplitude of the oscillations, represented by the vertical dimension of the wave form shown in FIG. 12, can be varied by adjusting the distance of the cam from the axis of shaft 36 by moving the third carriage along rack arm 31 as previously described. Likewise, the frequency of the oscillations for a given rate of progression of carriage 11 along the seam can be changed by increasing or decreasing the speed of rotation of the cam by manipulating the speed control knob 64 of motor 53. The frequency of the oscillations can also be changed by keeping the rotational speed of the cam constant and slowing down or speeding up the movement of carriage 11 on base 1 by manipulating the speed control knob 18 on motor 14. For any given cam contour, however, a change in the amplitude or frequency of the oscillations will not change the basic wave shape shown in FIG. 12, i.e., the proportions of dwell time to traverse time. That can be done only by changing the cam. Although it has been found that best results are obtained with a cam providing the wave form shown in FIG. 12 in which the dwell time is twice the traverse time, satisfactory welds can be produced with other wave forms of oscillation, provided the dwell time is at least equal to the traverse time and provided further that the ratio of dwell time to traverse time does not exceed about 8 to 1.

Referring now to FIGS. 13-22 inclusive, a modified form of the present invention is illustrated. Many of the components employed in this embodiment are substantially the same or equivalent to those previously described, and similar parts have been given the same reference numerals primed.

As seen in FIG. 13, a base 1' is supported upon a workpiece 2' which is adapted to be welded to a piece 3' along a seam 4'. The base includes an elongated channel 5' supported on cross member 6' provided with magnets 7' for attaching the cross members to the associated magnetic workpiece. As seen in FIG. 19, the workpiece 2' may be curved, and the base means as well as the rack bar 17' secured thereto is of a flexible construction so that it is adapted to conform to the curvature of the workpiece and to be connected to spaced points therealong by the magnets 7'.

Main carriage 11' is of substantially the same construction as the main carriage 11 previously described and is slidably supported for lengthwise movement along base means 1' and is keyed thereto by complementary ribs (not shown) on the side walls of slot 13' extending through the carriage which are slidably interlocked with V-shaped grooves 12' formed in each side of the base means. The main carriage is driven along the base means in the same manner as the base means 11, whereby the main carriage may be driven at a desired constant or variable speed back and forth along the length of the base means.

A rack post 21' extends perpendicularly from carriage 11', and this rack post is held in place by a clamp means 80. A carriage 22' is slidably supported on rack post 21', and the position of this carriage on the post can be continuously manually adjusted by means of a knob 23' connected to a pinion (not shown) that engages the rack portion of the post. A second knob 82 is provided for locking carriage 22' in desired operation position on the rack post 21'.

A rack arm 31' is slidably supported by second carriage 22' for reciprocal movement in a direction perpendicular to the directions of movement of the main carriage and the second carriage. The position of rack arm 31' may be continuously manually adjusted relative to the second carriage by means of a knob 84 which is connected to a pinion (not shown) engaging the rack portion of the arm. The rack arm 31' may be locked in desired operative position relative to the second carriage 22' by means of a knob 86.

A cam 51' identical with cam 51 previously described is adapted to cooperate with an oscillator bar 52', which acts as a cam follower. The cam is supported on and rotated by a variable speed electrical motor 53' supported on a third carriage 54' mounted on rack arm 31'. The position of carriage 54' on the arm can be manually adjusted by turning knob 56' which is connected to a pinion (not shown) and engages the rack portion of arm 31'. A further knob 58' is provided for locking the third carriage in the desired position on arm 31'.

Motor 53' is mounted on an upwardly extending portion 90 of third carriage 54', and a speed control means 92 is supported at the upper end of portion 90. This speed control means includes a manually adjustable knob 64' for controlling the speed of motor 53'. An electrical cable 94 is connected with a suitable source of electrical power, and a further electrical cable 96 connects the speed control means with motor 53'.

In this form of the invention, the cam follower bar 52' fits within an elongated slot 102 provided in a cam follower bracket 100. Bar 52' is fixed in operative position by set screws 104 extending through threaded holes provided in the bracket and engaging the bar.

The bracket includes a leg 62' to which is secured one end of a tension coil spring 59' the opposite end of which is secured to an angle bolt 61' adjustably supported at the outer split end of rack arm 31'. The position of the angle bolt with respect to the end of the arm may be varied to adjust the tension of spring 59'.

A support means 110 is provided, and as seen most clearly in FIG. 20, this support means comprises a substantially flat plate having a shaft 36' extending laterally therefrom. Referring again to FIG. 13, this laterally extending shaft 36' is rotatably journalled within a bearing 37' secured in the split end of rack arm 31'. The outer end of shaft 36' extends through a suitable hole provided in cam follower bracket 100 and is fixed to the cam follower bracket by a plurality of set screws 112, one of which is seen in FIG. 13 and which extend through suitable threaded holes provided in the bracket and engage the shaft. With this arrangement, oscillation of bar 52' will cause shaft 36' and support means 110 to oscillate with respect to the outer end of rack arm 31'.

Referring now to FIGS. 20 and 21 of the drawings, support means 110 has a first pair of holes 116 formed therethrough for attachment of a support member indicated generally by reference numeral 120. This support member comprises an angle including legs 122 and 124 extending substantially normally to one another. Leg 122 has a hole 126 formed therethrough as well as an elongated arcuate slot 128. The other leg 124 has a pair of spaced capped holes 130 formed therethrough.

A pair of screws 132 are adapted to extend through hole 126 and arcuate slot 128 and aligned holes 116 formed in the support means. Wing nuts 134 are threaded on the outer ends of screws 132. It is apparent that this arrangement enables the angular position of support member 120 relative to plate 110 to be adjusted in a first plane extending substantially parallel with the opposite faces of the support means. The angular position can be adjusted within the limits permitted by arcuate slot 128. It is apparent that the angular position of support member 120 is adjusted about a pivotal axis defined by the screw extending through hole 126 and the associated hole 116 in the support means 110.

A mounting bracket is indicated generally by reference numeral 140 and includes a first flat plate portion 142 having four spaced holes 144 formed therethrough. The mounting bracket includes a second flat plate portion 146 extending substantially normally from portion 142. Portion 146 has a first hole 148 and an arcuate slot 150 formed therethrough. A pair of elongated relatively straight slots 152 are also formed through portion 146.

A pair of thumb screws 160 are provided, these thumb screws being threaded throughout the length thereof and having nuts 162 threaded thereon for securing the thumb screws in operative position. As seen in FIG. 21, mounting bracket 140 is secured to support member 120, thumb screws 160 extending through slots 152 and being threaded into the tapped holes 130 formed in the support member. The nuts 162 on the thumb screws are threaded up tightly against portion 146 of the mounting bracket to hold the thumb screws in the position illustrated.

As seen most clearly in FIG. 20, support means 110 is also provided with a pair of spaced tapped holes 164 opening through a side edge thereof. As seen in FIG. 22, the mounting bracket may be secured directly to the support means 110, and the mounting bracket is disconnected from support member 120. In this position, the thumb screws 160 extend through hole 148 in the mounting bracket and the arcuate slot 150 therein, the ends of the thumb screws being threaded into the tapped holes 164 provided in support means 110. Nuts 162 are then tightened into the position shown in FIG. 2 to hold the mounting bracket in the desired position.

The arrangement shown in FIG. 22 enables the angularity of the mounting bracket with respect to the support means 110 to be adjusted about an axis defined by the thumb screw which extends through the hole 148 of the mounting bracket.

It is accordingly apparent that the arrangement shown in FIGS. 21 and 22 enables adjustment of the mounting bracket in two mutually perpendicular planes. This mounting bracket in turn supports the welding head hereinafter described so that the welding head can accordingly be adjusted in such planes relative to the support means 110.

As seen in FIG. 20, the welding head includes a pair of cover portions 170 and 172 which are adapted to be connected with one another. Cover portion 170 has a recessed area 174 therein for receiving portion 142 of the mounting bracket 140. A plurality of holes 176 are formed through the recessed area of cover portion 170, and suitable fastening means such as screws 178 extend through the holes 144 provided in the mounting bracket and the holes 176 in the cover portion for securing the mounting bracket to the cover means.

A conventional portable welding gun indicated generally by reference numeral 180 in FIG. 15 includes a manually graspable handle portion 182 as seen in FIG. 13, this handle portion projecting through suitable cut-outs provided in cover portions 170 and 172 of the welding head. The trigger of the welding gun is normally held in its closed position by means of a trigger lock band 184 which may comprise a conventional worm drive hose clamp. This lock band is of course taken off when the welding gun is removed from the supporting cover means of the welding head. As seen in FIG. 20, the two cover portions of the cover means can be readily separated from one another, whereupon the portable welding gun may be lifted out of the cover means and used as a portable welding gun in the usual manner. As seen in FIG. 15, the welding gun includes a depending portion 190 which supports a conventional nozzle 192. The end of a welding wire 198 is illustrated as projecting from the nozzle.

As seen in FIG. 13, a canister support arm 200 is supported from the main carriage 11' and extends laterally therefrom. A canister mounting plate 202 is supported from arm 200 and serves to support a canister 204 within which is disposed a suitable supply of welding wire. The welding wire is fed through a suitable guiding conduit means 206 into the welding head and into the welding gun. A further conduit means 210 is connected with the welding head and preferably comprises a coaxial conduit means wherein a central electrical cable is employed for providing electrical welding current to the welding gun, and the surrounding conduit portion is adapted to conduct an inert gas to the nozzle means.

As seen most clearly in FIGS. 13 and 20, an arc start switch 214 is supported by cover portion 170 and is electrically connected in series with a switch of the welding gun. This arc start switch allows the arc to be started independently of the shielding gas, but it is impossible to start the arc without the shielding gas being on.

Referring now to FIG. 14 of the drawings, the shield means of the present invention includes a viewing shield 220 which is opened at the bottom thereof and which includes an elongated slot 222 in the top wall thereof for receiving the reciprocating depending portion 190 of the associated welding gun. This viewing shield is provided with holes 224 on one side thereof for securing the viewing shield to a support arm for supporting the viewing shield from the main carriage 11'. A laterally extending support arm 230 has a first flat plate-like portion 232 with holes 234 formed therethrough. These holes are adapted to be aligned with holes 224, and screws 236 extend through these aligned holes and have nuts 238 threaded on the outer end thereof for securing the shield 220 to portion 232 of the support arm.

The support arm includes a second flat plate-like portion 240 extending substantially perpendicular to the portion 232 and integrally joined therewith. Portion 240 of the support arm is provided with a pair of holes 242 formed therethrough which are adapted to be aligned with holes 244 in a boss formed on main carriage 11'. Screws 246 are adapted to extend through aligned holes 242 and 244 and have nuts 248 threaded on the outer ends thereof for securing the support arm to the main carriage.

A flexible draft control skirt formed of a suitable material such as asbestos or the like is indicated generally by reference numeral 250, and is adapted to fit around the bottom periphery of viewing shield 220. This skirt is of flexible construction and is adapted to engage associated workpieces as seen for example in FIG. 15. The skirt has a plurality of spaced holes 252 formed therethrough which are adapted to be aligned with spaced holes 254 formed in the lower side wall portions of the viewing shield. A plurality of clamping bars 256 are provided with spaced holes 258 therethrough which are adapted to be aligned with the holes formed in the skirt. Suitable screws 260 extend through the aligned holes formed in the clamping bars, the skirt and the viewing shield and have nuts 262 threaded thereon for rigidly securing the skirt in position.

A viewing window 49' similar to the window 49 previously described is hingedly supported by the viewing shield, whereby the operator can continuously watch and monitor the welding operation.

The apparatus is illustrated in FIG. 15 in position to produce a weld wherein the workpieces are disposed in substantially horizontal relationship. FIG. 17 illustrates the form of the weld 266 produced by the apparatus of the present invention as the welding head oscillates back and forth along the seam between the two workpieces 3' and 4'.

Referring now to FIG. 18, a typical multi-pass weld is illustrated wherein the completed weld 270 is produced by making successive passes which result in layers 272, 274, 276 and 278 produced in succession to form the completed weld.

FIG. 16 illustrates an arrangement wherein the welding operation is to be carried out on adjacent workpieces W which are disposed in substantially vertical position. When the workpieces are so oriented, the welding gun of the welding head is adjusted so that the nozzle thereof is at an angle with respect to horizontal.

As shown in FIG. 16, this angular relationship is preferably such that the nozzle is angled downwardly about 5 degrees, the nozzle moving upwardly as seen in FIG. 16 to complete the weld. This slight downward inclination of the welding gun nozzle provides improved results when welding is done along workpieces extending substantially vertically. This adjustment is obtained by connecting the mounting bracket 140 with the support means 110 as shown in FIG. 22 and adjusting the mounting bracket so that the welding head is at the desired inclination with respect to the plane of oscillation of support means 110.

It is among the advantages of this invention that although it makes provision for continuous adjustment in the position of the welding head and its supported electrode for following a given seam to be welded, and also for continuous adjustment of the frequency and amplitude of the oscillations of the head and electrode to meet different operating conditions, these adjustments need to be made only infrequently. Once the apparatus is set up and adjusted for given conditions, welding proceeds substantially automatically, providing welds of a quality and uniformity that cannot be matched by hand operation or by mechanical apparatus heretofore available. In addition, the operator can at all times monitor the welding operation through the viewing window of the shield means and can make any adjustments that are required without exposing the welding area to the ambient atmosphere. It is a further advantage of the present invention that it can be used in welding horizontal or vertical seams, including overhead seams, in the shop or in the field. This capability is due largely to the portability and flexibility of the apparatus and to the means provided for securing it to the work surface. As a result, the use of this invention greatly reduces the time required for making welds and provides greatly superior and more uniform welds than it has heretofore been possible to obtain.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

What is claimed is:

1. Portable welding apparatus capable of use in any orientation for welding a seam between adjacent edges of two workpieces, comprising:
   (a) a flexible track;
   (b) means carried by said flexible track for readily removably securing said track to one of the workpieces;
   (c) a main carriage movably mounted on said track;
   (d) means for driving said main carriage along said track;
   (e) a rack post carried by said main carriage and extending perpendicularly therefrom;
   (f) a second carriage movably mounted on said rack post;
   (g) means for adjusting the position of said second carriage along said rack post toward and away from said workpieces;
   (h) a rack arm movably carried by said second carriage and extending perpendicularly to said rack post and laterally with respect to said track;
   (i) means for adjusting said rack arm with respect to said second carriage to adjust said rack arm laterally of said seam to be welded;
   (j) a welding head pivotally supported on the end of said rack arm;
   (k) cam means longitudinally adjustably carried on said rack arm, said cam means comprising first and second axially offset cam portions, said first cam portion having a greater radius than said second cam portion and having a segment removed therefrom, first and second diametrically opposite cylindrical cam surfaces on said first and second cam portions respectively, first and second diametrically opposite spiral cam surfaces on said first cam portion joining said first cylindrical cam surface with a chord from which said segment is removed, said chord being spaced radially inwardly relative to said second cylindrical cam surface; and
   (l) cam follower means connected to said welding head and in operative engagement with said cam means for effecting continuous oscillation of said welding head across a seam to be welded, said adjustment of said cam means enabling adjustment of the amplitude of said oscillations.

2. Portable welding apparatus as in claim 1, wherein:
   (a) said means carried by said track means for removably securing said track to said workpiece comprises the sole means for securing said track to said workpiece.

3. Portable welding apparatus as in claim 1, wherein:
   (a) a third carriage is movably mounted on said rack arm intermediate said welding head and said second carriage, and said cam means is carried by said third carriage means for movement therewith, said third carriage means including means for manually adjusting said third carriage means along said rack arm to vary the distance between said cam means and the pivotal axis of said cam follower means to adjust the amplitude of movement of said follower means and the oscillation of said welding head.

4. Portable welding apparatus as in claim 1, wherein:
   (a) said cam follower means comprises a cam follower bar having one edge in overlapping abutting engagement with said first and second cam portions, whereby the cam surface having the greatest radial dimension controls movement of said cam follower bar.

5. Portable welding apparatus as in claim 1, wherein:
   (a) said welding head is mounted to a support bracket including a laterally extending shaft rotatably journaled within a bearing secured to the end of said rack arm; and
   (b) said cam follower means comprises a cam follower bar fixed at one end to said shaft and in abutting engagement at its other end with said cam means.

6. Portable welding apparatus as in claim 5, wherein:
   (a) a support member is movably secured to said support bracket, said support member including a first portion having an arcuate slot and a hole formed therethrough, bolts received through said slot and said hole and aligned holes in said support bracket for effecting pivotal adjustment of said support member relative to said support bracket, said support member having a second portion extending substantially normally to said first portion;
   (b) a mounting bracket including a first flat plate portion having a hole, an arcuate slot and a pair of parallel slots therethrough laterally movably secured to said second portion of said support member by bolts received through said parallel slots and through aligned holes in said second portion, said mounting bracket pivotally secured to said support bracket by means of bolts received through said arcuate slot and said hole in said flat plate portion and into aligned tapped holes in an edge portion of said support bracket, said mounting bracket further including a second flat plate portion extending substantially normally to said first flat plate portion, and said welding head secured to said second flat plate portion, whereby loosening of said bolts received through said slots enables said welding head to be pivotally adjusted in two mutually perpendicular planes and laterally adjusted in one of said planes relative to said support bracket to make fine adjustments to compensate for variations in alignment of said welding head relative to a seam to be welded.

7. Portable welding apparatus as in claim 6, wherein:
(a) said welding head is encased within two readily separable cover portions and is readily removable therefrom upon separation of said cover portions, one of said cover portions being secured to said second flat plate portion of said mounting bracket.

8. Portable welding apparatus as in claim 1, wherein:
(a) said means for adjusting the position of said second carriage along said rack post comprises continuously manually adjustable means.

9. Portable welding apparatus as in claim 1, wherein:
(a) said means for adjusting said rack arm with respect to said second carriage comprises continuously manually adjustable means.

10. Portable welding apparatus as in claim 1, wherein:
(a) said means for driving said main carriage along said track includes means for continuously adjusting said drive means for controlling the rate of movement of said main carriage.

11. Portable welding apparatus as in claim 2, wherein:
(a) said means carried by said track means includes magnetic means on said track means for securing said track means to an associated workpiece.

12. Portable welding apparatus as in claim 2, wherein:
(a) said means carried by said track means includes vacuum pads on said track means for securing said track means to an associated workpiece.

13. Portable welding apparatus as in claim 1, wherein:
(a) a shielding cone is secured to the base of said welding head, and a flexible skirt member is attached to the bottom of said cone for sealingly engaging a workpiece to be welded to isolate the area of the weld from the ambient atmosphere.

14. Portable welding apparatus as in claim 1, wherein:
(a) the angles subtended by said cylindrical cam surfaces are at least equal to but less than eight times as large as the angles subtended by the spiral cam surfaces so that, upon rotation of the cam at a uniform speed, the duration of each dwell portion of an oscillatory cycle is at least as long as but does not exceed eight times that of each traverse portion.

15. Portable welding apparatus as in claim 14, wherein:
(a) the angle subtended by each of said cylindrical cam surfaces is substantially 120° and the angle subtended by each of said spiral cam surfaces is substantially 60°.

16. Portable welding apparatus as in claim 5, wherein:
(a) said cam follower bar is connected directly to said shaft for directly effecting oscillation of said welding head.

17. Portable welding apparatus as in claim 1, wherein:
(a) means are connected with said cam means for continuously adjusting the rotational speed of the cam for varying the frequency of said oscillations.

18. Portable welding apparatus as in claim 1, wherein:
(a) said welding head includes a nozzle at the outer end thereof, shield means disposed in surrounding relationship to said nozzle, said shield means being carried by said main carriage.

19. Portable welding apparatus as in claim 18, wherein:
(a) a laterally extending support arm has one end thereof connected to said main carriage, the opposite end of said support arm being connected with said shield means.

20. Portable welding apparatus as in claim 18, wherein:
(a) said shield means has an elongated slot therein for receiving an oscillating portion of said welding head.

21. Portable welding apparatus as in claim 18, wherein:
(a) a flexible skirt is carried by said shield means and depends therefrom.

22. Portable welding apparatus as in claim 18, wherein:
(a) said shield means includes viewer means.

23. Portable welding apparatus as in claim 7, wherein:
(a) a separable welding gun is removably supported by said cover means.

24. Portable welding apparatus as in claim 23, wherein:
(a) a manually operable arc start switch is supported adjacent said welding gun.

25. Portable welding apparatus as in claim 1, wherein:
(a) a supply of welding wire for said welding head is supported in a canister supported from said main carriage.

References Cited

UNITED STATES PATENTS

| | | | |
|---|---|---|---|
| 1,933,340 | 10/1933 | Raymond | 219—124 |
| 1,956,406 | 4/1934 | Vars | 219—125 |
| 2,395,723 | 2/1946 | Chmielewski | 219—126 |
| 2,900,486 | 8/1959 | Williams et al. | 219—125 |
| 2,944,141 | 7/1960 | Lovrenich | 219—124 |
| 3,076,889 | 2/1963 | Enk | 219—125 |
| 3,128,368 | 4/1964 | Franz et al. | 219—125 |
| 3,171,012 | 2/1965 | Morehead | 219—125 |
| 3,249,733 | 5/1966 | Santilhano | 219—126 |

WILLIAM D. BROOKS, Primary Examiner

U.S. Cl. X.R.

219—137